(12) United States Patent
Wilson

(10) Patent No.: US 6,295,588 B1
(45) Date of Patent: Sep. 25, 2001

(54) MEMORY ACCESS CONTROLLER THAT CONVERTS MEMORY ACCESS REQUESTS INTO MEMORY ACCESS COMMANDS

(75) Inventor: William Brent Wilson, British Columbia (CA)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/231,019

(22) Filed: Jan. 14, 1999

(30) Foreign Application Priority Data

Jan. 22, 1998 (JP) ................................. 10-010242

(51) Int. Cl.[7] ..................................... G06F 13/18
(52) U.S. Cl. .............................................. 711/158
(58) Field of Search .................... 711/105, 154, 711/158, 167, 168, 169

(56) References Cited

U.S. PATENT DOCUMENTS 5,990,913 * 11/1999 Harriman et al. ................. 345/521
6,047,361 * 4/2000 Ingenio et al. ..................... 711/167

OTHER PUBLICATIONS

NEC Preliminary Data Sheet MOS Integrated Circuit for μPD 4516421, 4516821, 45116161 16 Mbit Synchronous DRAM document No. ID-394 Ver. 4.0 (Mar. 1994).

ISO/IEC International Standard Information-Generic Coding of Moving Pictures and Associated Audio Information: Video First Edition (May 1996), Reference No. ISO/IEC 13818-2: 1996.

* cited by examiner

Primary Examiner—Kevin L. Ellis
(74) Attorney, Agent, or Firm—Greenblum & Bernstein, P.L.C.

(57) ABSTRACT

A memory access controller generates memory access commands from memory access requests. A sequence of memory access requests is input and destributed to need-makers. Each need-maker determines the memory access command needed by it's respective memory access request. These needs are passed to and prioritized by a prioritizer. The desired memory access command is then selected from these prioritized needs according to the requirements of the memory. This can be done by checking each prioritized need against a set of memory rules. The prioritized needs which pass all the required memory rules are then passed to a command output selector which selects the most appropriate one, resulting in the desired memory access command.

12 Claims, 5 Drawing Sheets

MEMORY ACCESS CONTROLLER THAT CONVERTS MEMORY ACCESS REQUESTS INTO MEMORY ACCESS COMMANDS

BACKGROUND OF THE INVENTION

1. Field of the Invention

The present invention relates to the implementation of memory access interfaces suitable for multimedia processors.

2. Description of the Related Art

Many computer and multimedia systems require memory access interfaces permitting the transfer of data to and from memory, as well as additional control functions that may be required. This memory may be used to store temporary variables, control information, frame memories for picture storage, and other requirements of the system. Control functions for such memories may include initialization, refresh and memory bank overlapping, also known as ping-ponging. Speed of data transfer and efficiency of data transfer are typically high priorities in such systems. Consumer multimedia systems and computer systems require high performance access to memories. Often, to ensure minimum cost of the system, the memories are operated very close to their optimal bandwidth. In other words, less expensive memory is typically lower performance, so to reduce system costs, developers use inexpensive memories and try to operate them as close as possible to their upper performance limit.

To approach this upper performance limit, typically complex memory access interfaces are used. For example, DRAM semiconductor memory access requires a RAS cycle to set the row address before successive column addresses for that row can be set to initiate data transfers. By using two or more banks of DRAMs, one bank can perform a RAS cycle while another performs data transfers. This concept is formalized by the use of SDRAM which is designed for such bank ping-ponging (for example, see NEC uPD4516161G5-A12-7JF specifications for 16 Mbit SDRAM).

To reduce complexity and cost of implementing memory access interfaces, the easiest way is to match the internal process timing to the external memory type or configuration. For example, in an MPEG-2 (see "IS 13818—Generic Coding of Moving Pictures and Associated Audio" by International Organization for Standardization, ISO MPEG Document, ISO-IEC/JTC1/SC2/WGI11 1994) video decoder integrated circuit using SDRAM as it's frame store, the motion compensation process which reads motion compensated macro-block pixel information from the SDRAM may generate row and column addresses with a timing similar to that required by the SDRAM. Thus, ping-ponging of banks is achieved by the motion compensation process. Matching internal process timing to the external memory type usually ties the internal architecture to the type or configuration of the external memory used. Thus, the internal generation of addresses by each internal process is designed specifically for a particular memory type or configuration.

There are several problems which this invention solves. An object of this invention is to permit memory accesses to occur sequentially as close together as possible in order to maximize the performance of memory accesses. Some memory systems require some kind of preprocessing to occur before the data transfer of a memory access can occur. For example, DRAM semiconductor memories require RAS and CAS cycles to initiate memory accesses. In a system with multiple DRAMs, it is possible to overlap in time the RAS cycles of one or more DRAMs with the CAS cycles of other DRAMs. Another example is SDRAM which contains multiple banks allowing for the overlap of one bank pre-processing with another banks data transfers. The control and optimization of timing for this overlap may result in complicated memory access controllers with complicated interfaces to the processes requiring access to the memory. An object of this invention is the implementation of a memory access controller with simple interfaces to processes requiring high performance access to memories. An object of this invention is the isolation of the processes requiring memory access from the control of the memory itself.

SUMMARY OF THE INVENTION

An object of the present invention is to permit the easy migration of a memory access controller to new or different memory types or configurations. Electronics products requiring memory migrate between types or configurations of memory as dictated by cost and performance considerations. Memory cost and performance changes rapidly as memory technology advances. Likewise, the applications which use memory must also change rapidly in order to take advantage of these changes. It is an object of this invention to permit the implementation of a memory access controller for one memory type to be easily modified to support alternative memory types. It is an object of this invention to permit the portability of a memory access controller between systems using different memory types or configurations.

An object of the present invention is to permit the easy migration of a memory access controller for use in different applications with different memory access requirements. A new application may use the memory differently from a previous application, but it is not cost effective to redesign the memory access controller, when instead a more general purpose memory access controller design can be used which does not require a lot of changes. It is an object of this invention to permit the implementation of a memory access controller for one set of memory access requirements and functionality to be easily modified to support alternative memory access requirements and functionality. It is an object of this invention to permit the portability of a memory access controller between different systems requiring different access to memory.

An object of the present invention is to reduce the size of memory access controllers without reducing the performance. For example, high performance and low cost is a requirement for consumer electronics.

For the purpose of solving the above-described problems, the memory access controller described herein was invented. Said memory access controller is used for converting memory access requests into memory access commands. Sequences of said memory access requests are input via a request input. An input logic accepts said memory access requests from said request input and demultiplexes said memory access requests into one or more requests, which are passed to corresponding need-makers. Said need-makers are used for determining needs, said needs indicating what memory access command is needed for each of said requests. Said needs are prioritized by a prioritizer resulting in prioritized needs. A need selector selects from said prioritized needs said memory access command. Said need selector comprises of a rule-checker which checks each said prioritized need against a set of rules and generates a corresponding prioritized command if said set of rules permits. Within said rule-checker, prioritized rule-checkers are used to check each of said prioritized needs against a set of rules generated by rule logic. A command output selector selects said memory access command from said prioritized commands. Sequences of said memory access commands are output via a command output.

The sequential memory access request input permits a simple interface between processes requiring access to memory and the memory, regardless of memory type or configuration. Multiple need-makers, prioritizers and prioritized rule-checkers are used to optimally overlap memory access preprocesses with the data transfers or other preprocesses. The prioritized commands which result from the prioritized rule-checkers are a set of possible commands for generating the control signals for memory accesses. They are effectively queued at the inputs to the command output selector until the first opportune moment when they can be issued to the memory. This results in optimal sequential output of memory access commands, thus permitting the maximum performance of memory access to be achieved. The processes which issue the memory access requests are not involved in the overlapping of memory access control commands, so they are isolated from many of the design details of the memory access itself. They simply send sequential memory access requests to the invented memory access controller, which are optimally organized as memory access commands by the invented memory access controller. This isolation means that changes to the memory tape or configuration may not require significant changes to the processes which issue memory access requests. For example, the need-makers, rule logic and rule-checkers may be modified to support a different memory configuration without requiring changes to internal processes which need memory access. Similarly, if the processes change, for example a new process is added, it does not require large changes to the memory access controller since it is general purpose. For example, once designed for SDRAM access, the same design is suited for many applications requiring SDRAM access since the concept of minimizing overhead between successive memory access commands is suitable for all applications requiring maximum performance. The simple architecture of this invention is easily implemented with a small amount of logic, hence low cost, and the optimal memory access command output enables high performance.

DESCRIPTION OF THE PREFERRED EMBODIMENTS

Figure 1:
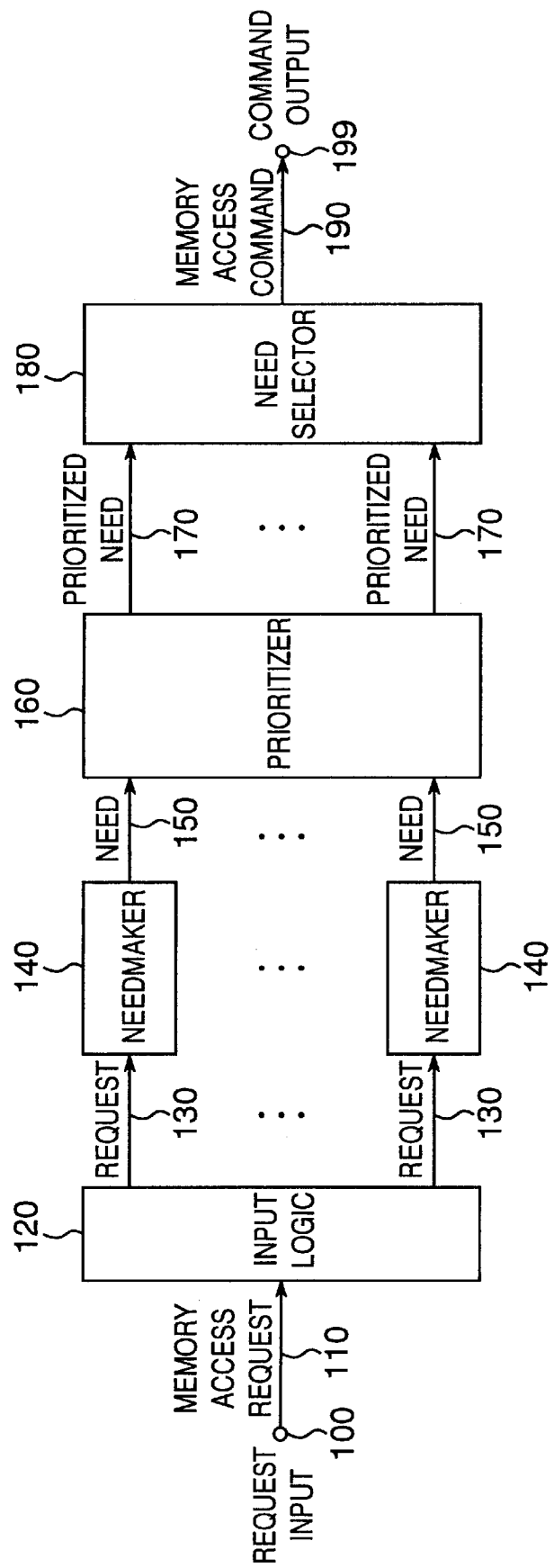
FIG. 1 is a block diagram describing one embodiment of the present invention.

An example embodiment of this invention is shown in FIG. 1. The request input 100 passes memory access requests 110 to the input logic 120. The input logic distributes requests 130 to need-makers 140 which generate needs 150. The prioritizer 160 arranges the needs 150 by priority and passes them as prioritized needs 170 to the need selector 180. The need selector 180 determines from the prioritized needs 170 which should be selected as the memory access command 190, which is output via the command output 199.

The operation of the embodiment of FIG. 1 is now described. The input logic 120 accepts the memory access requests 110 from the request input 100 and demultiplexes them to the need-makers sequentially. Each need-maker 140 generates the memory access control signals required for it's respective memory access requests. The prioritizer 160 reorders the needs 150 coming out of each need-maker 140 such that the higher priority of the prioritized needs 170 corresponds to the earlier memory access request. In this way, the highest priority prioritized need 170 corresponds to the memory access request which will occur next. The need selector 180 selects from the prioritized needs 170 the resulting memory access command 190. Generally, prioritized needs 170 may indicate commands to be issued to the memory itself. The selection of which prioritized need 170 to select by the need selector 180 can be as simple as selecting the highest priority, prioritized need 170 or applying additional rules. For example, the need selector 180 may choose a lower priority prioritized need 170 when certain combinations of prioritized needs 170 occur. For example, a lower priority prioritized need 170 may be a pre-processing command which sets up the memory for a later memory data transfer. The need selector 180 may output this pre-processing command so that it is processed at the same time as a higher priority data transfer is occurring, thus overlapping pre-processing and data transfers.

The embodiment of FIG. 1 does not limit the number of need-makers 140, needs 150 and prioritized needs 170. In addition, it is not a requirement of the invention that the memory access requests 110 are demultiplexed sequentially to the need-makers 140. Another appropriate order of demultiplexing could be used.

The effect of this embodiment described by FIG. 1 is the simple sequential input of memory access requests is converted to optimally overlapped memory access commands. The memory command generation is performed by the memory access controller isolating the memory architecture from the processes requiring memory access.

Figure 2:
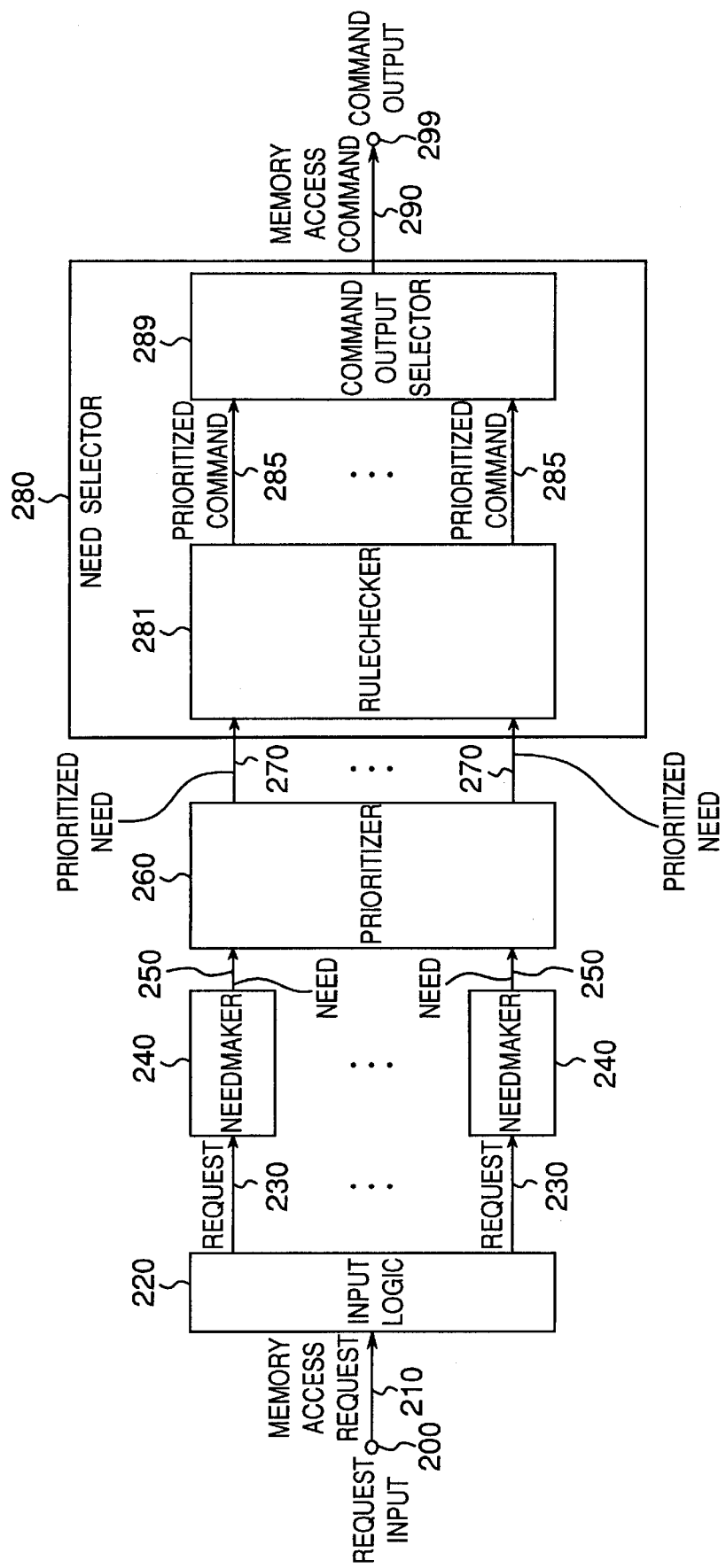
FIG. 2 is a block diagram describing one embodiment of the present invention.

Another embodiment of this invention is shown in FIG. 2. The request input 200 passes memory access requests 210 to the input logic 220. The input logic distributes requests 230 to need-makers 240 which generate needs 250. The prioritizer 260 arranges the needs 250 by priority and passes them as prioritized needs 270 to the need selector 280. Each prioritized need 270 is passed to a rule-checker 281 which determines the prioritized command 285 corresponding to each prioritized need 270. The command output selector 289 determines from the prioritized commands 285 which should be selected as the memory access command 290, which is output via the command output 299.

The operation of the embodiment of FIG. 2 is now described. This embodiment shows more detail of the need selector 280. The need selector 280 in this embodiment has multiple rule-checkers 281 which check the prioritized needs 270 if they are acceptable memory access commands 290. If they are, they are passed as prioritized commands 285 to the command output selector 289 which selects the appropriate memory access command 290 to output. As described for the embodiment of FIG. 1, the command output selector 289 can select from the prioritized commands 285 based on their relative priorities as well as on additional criteria such as the type of each prioritized command 285.

Similarly to the embodiment of FIG. 1, the embodiment of FIG. 2 does not limit the number of need-makers 240, needs 250, prioritized needs 270 and prioritized commands 285.

Figure 3:
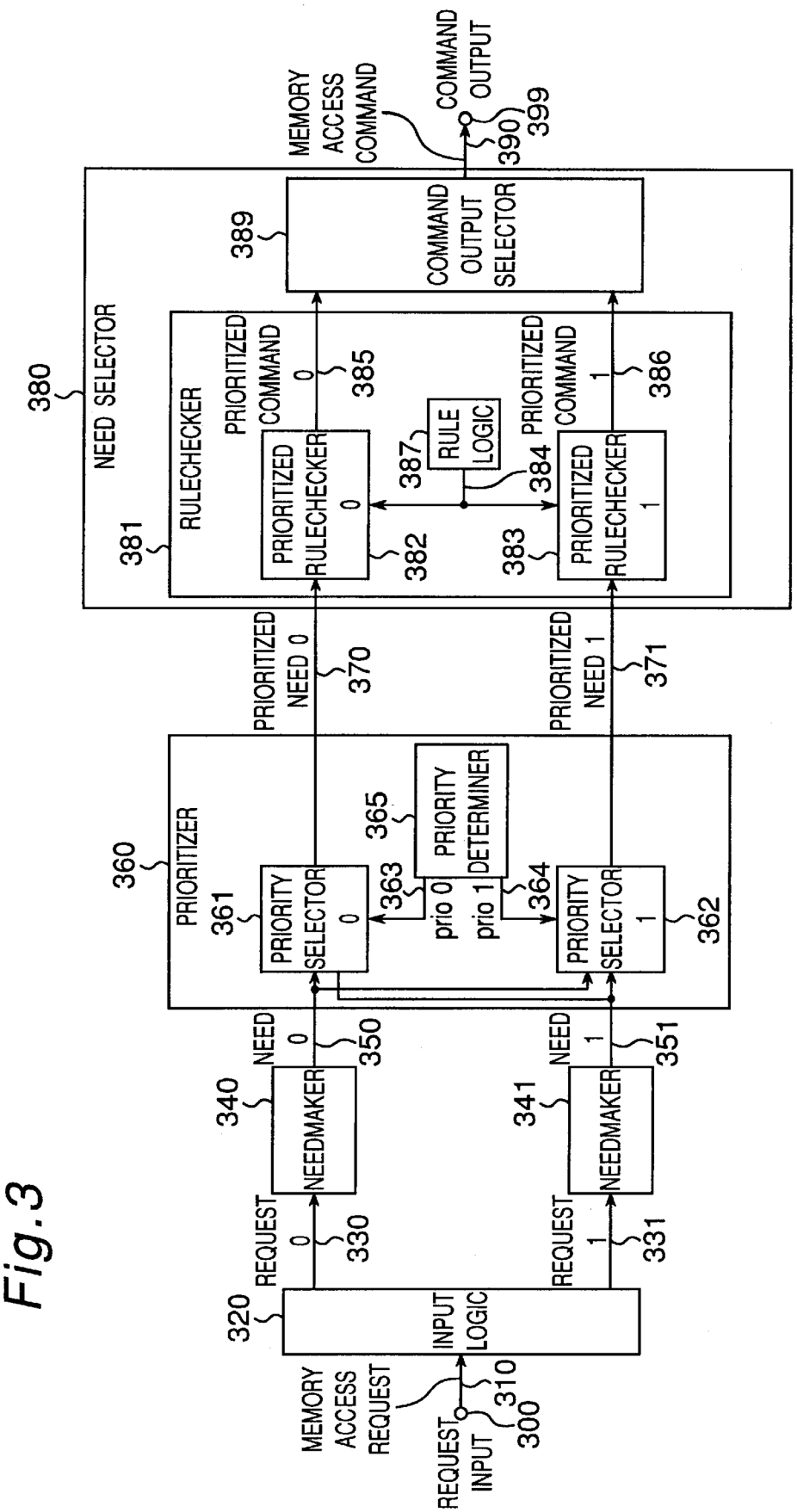
FIG. 3 is a block diagram describing one embodiment of the present invention.

Another embodiment of this invention is shown in FIG. 3. The request input 300 passes memory access requests 310 to the input logic 320. The input logic 320 distributes these requests to request0 330 and request1 331 which are inputs for need-maker0 340 and need-maker1 341 respectively. Need-maker0 340 and need-maker1 341 generate need0 350 and need1 351 respectively. The prioritizer 360 arranges need0 350 and need1 351 by priority and passes them as prioritized need0 370 and prioritized need1 371 to the need selector 380. The priority determiner 365 determines the priority of need0 350 and need1 351 and tells priority selector0 361 and priority selector1 362 this result via prio0 363 and prio1 364. Priority selector0 361 selects either need0 350 or need1 351 to be prioritized need0 370 based on prio0 363. Priority selector1 362 selects either need0 350 or need1 351 to be prioritized need1 371 based on prior 364.

Prioritized need0 370 is passed to prioritized rule-checker0 382 which determines the prioritized command0 385. Prioritized need1 371 is passed to prioritized rule-checker1 383 which determines the prioritized command1 386. Rules 384 generated by rule logic 387 is passed to prioritized rule-checker0 382 and prioritized rule checker1 383. The command output selector 389 determines from prioritized command0 385 and prioritized command1 386 which should be selected as the memory access command 390, which is output via the command output 399.

The operation of the embodiment of FIG. 3 is now described. This embodiment shows more detail of the prioritizer 360. The prioritizer 360 in this embodiment has priority selector0 361 which selects either need0 350 or need1 351 to be prioritized need0 370, priority selector1 362 which selects either need0 350 or need1 351 to be prioritized need1 371. The decision of which need to select is determined by the priority determiner 365 which outputs the selection decision prioo 363 to priority selector0 361 and the selection decision prio1 364 to priority selector1 362. The rule-checker 381 in this embodiment has prioritized rule-checker0 382 for checking prioritized need0 370 and prioritized rule-checker1 383 for checking prioritized need1 371. If they are ok as determined using rules 384 generated by rule logic 387 they are sent as prioritized command0 385 and prioritized command1 386 to the command output selector 389 which selects from them the appropriate memory access command 390 to output.

Although the embodiment of FIG. 3 describes two requests 330 and 331, two need-makers 340 and 341, two priority selector0 361 and 362, two prioritized needs 370 and 371, two prioritized rule-checkers 382 and 383 and two prioritized commands 385 and 386, this invention is not limited to just two of each of the aforementioned items. These items can number 1 or more. The number of prios 363 and 364 can be 1 or more. For example, the same signal can be used for any or all priority selectors 361 and 362. Similarly, the same or different rules 384 can be used by the prioritized rule-checkers 382 and 383.

Figure 4:
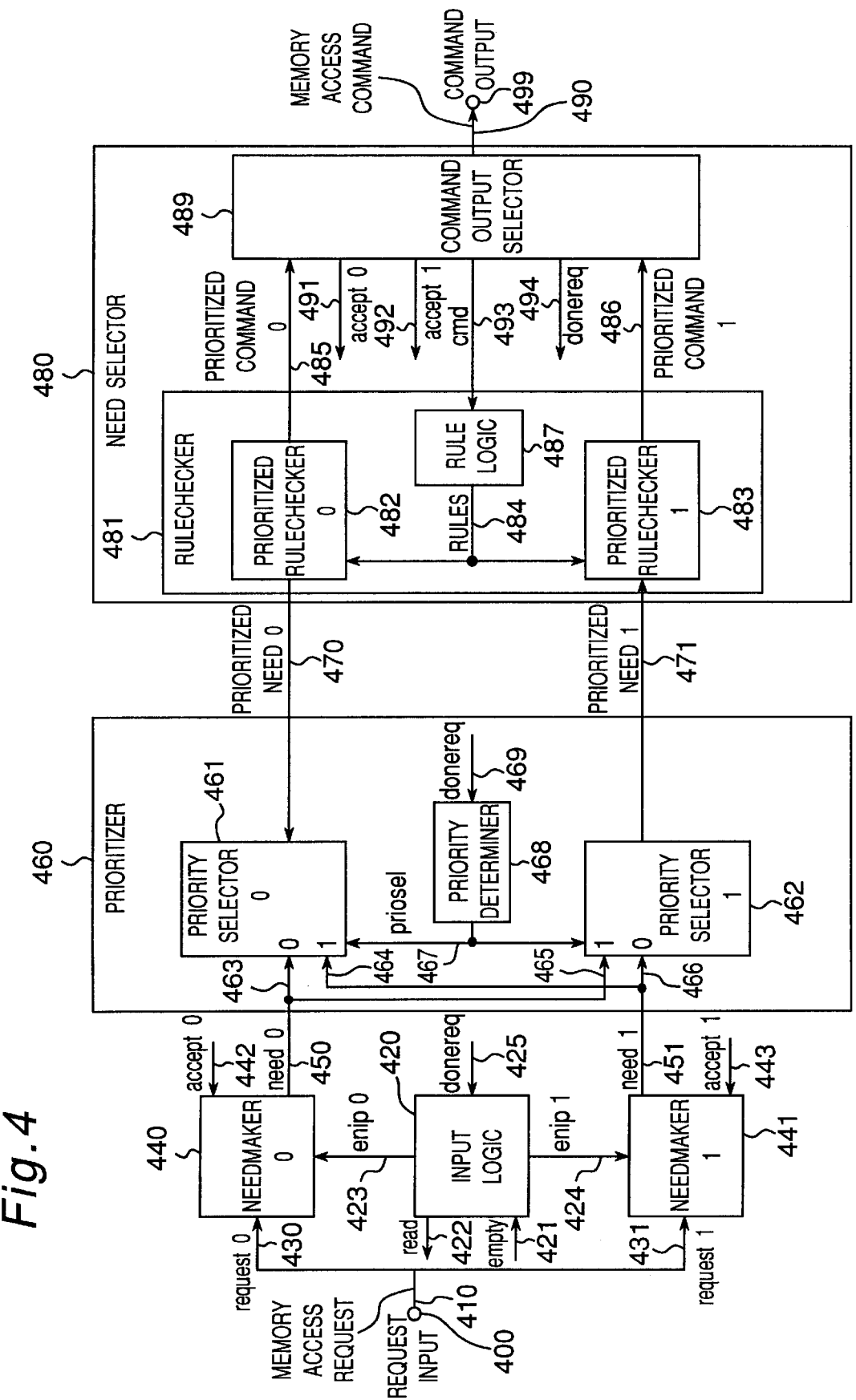
FIG. 4 is a block diagram describing one embodiment of the present invention.

Another embodiment of this invention is shown in FIG. 4. The request input 400 passes memory access requests 410 via request0 430 and request1 431 to the need-maker0 440 and need-maker1 441 respectively, using the enip0 423 and enip1 424 signals from the input logic 420 to demultiplex the requests 430 and 431. In this embodiment, the input logic 420 acts as, for example, a FIFO interface reading the memory access request 410 from an input FIFO and directing these requests 430 and 431 to the need-makers 440 and 441. The empty 421 signal is used to indicate when the input FIFO contains a valid memory access request 410. Need-maker0 440 and need-maker1 441 generate need0 450 and need1 451 respectively. The prioritizer 460 arranges need0 450 and need1 451 by priority and passes them as prioritized need0 470 and prioritized need1 471 to the need selector 480. The priority determiner 468 determines the priority of need0 450 and need1 451 and tells priority selectors 451 and priority selector1 462 this result via priosel 467. Priority selectors 461 selects either need0 463 or need1 464 to be prioritized need0 470 based on priosel 467. Priority selector1 462 selects either need0 465 or need1 466 to be prioritized need1 471 based on priosel 467. Prioritized need0 470 is passed to prioritized rule-checker0 482 which determines the prioritized command0 485. Prioritized need1 471 is passed to; prioritized rule-checker1 483 which determines the prioritized command1 486. Rules 484 generated by rule logic 487 is passed to prioritized rule-checker0 482 and prioritized rule-checker1 483. The command output selector 489 determines from prioritized command0 485 and prioritized command1 486 which should be selected as the memory access command 490, which is output via the command output 499.

The operation of the embodiment of FIG. 4 is now described. This embodiment shows an example of how a FIFO can be used to supply sequential memory access requests 410. The input logic 420 controls the timing of reading the FIFO and uses enip0 423 and enip1 424 to indicate which request 430 and 431 is to be input to need-maker0 440 and need-maker1 441. In this embodiment, the input logic simply selects them alternatively. The first memory access request 410 goes to need-maker0 440, the second to need-maker1 441, the third to need-maker0 440, and so on.

In this example embodiment, the need-makers 440 and 441 generate commands for SDRAM accesses where the SDRAM has 2 banks of memory. Each request 430 and 431 results in a series of SDRAM commands. Two series are possible: Precharge followed by Activate, followed by Read command; or simply a Read command. In this embodiment, the completion of a series of commands corresponding to a memory access request is indicated using the donereq 425, 469 and 494 signal which originates from the command output selector 489. The donereq input 425 to the input logic 420 is used to toggle the selection of need-makers 440 and 441 for input of requests via request0 430 and request1 431. The donereq input 469 to the priority determiner 468 is used to toggle the priosel 467 input of the priority selectors 461 and 462. In this embodiment, the completion of each command within a series is indicated by the accept0 442 and 491 and accept1 443 and 492 signals which also originate from the command output selector 489. The accept0 442 input to need-maker0 440 is used to indicate that the command in a sequence of commands originating from it has been accepted, and the next command in the sequence can be generated. Similarly, the accept1 443 input to need-maker1 441 is used to indicate that the command in a sequence of commands originating from it has been accepted, and the next command in the sequence can be generated.

In this example embodiment, the rulelogic 487 generates a set of rules based on the previously selected memory access commands output 490. The cmd 493 indicates what memory access command is output. For this embodiment, the rule logic 487 generates rules based on the rules of SDRAM. For example, it specifies the timing between successive commands such as Precharge to Activate timing, and Activate to Read timing. In this embodiment, the output from rule logic 487 is a set of rules 484 which indicate what SDRAM commands are possible. For example, if a bank0 Precharge is possible, rules 484 indicates that. If a bank1 Read is possible, rules 484 indicates that. The prioritized rule-checkers 482 and 483 check the prioritized needs 470 and 471 against the set of rules 484 and acceptable commands are output as the prioritized commands 485 and 486. For example, if prioritized need0 470 indicates a Precharge command for bank0 is needed, and rules 484 indicate the SDRAM can accept a Precharge command, then the prioritized command0 485 indicates that a Precharge command bank0 is required. On the other hand, if the rules 484 indicate that the SDRAM cannot accept the Precharge command, prioritized command0 485 will not indicate that the Precharge command is required.

In this example embodiment, the command output selector 489 generates the donereq 494 whenever a final command in a sequence of SDRAM commands is issued. For this embodiment, the final command is a Read. When a Read command is output, the command output selector 489 sets the donereq 494 output.

Figure 5:
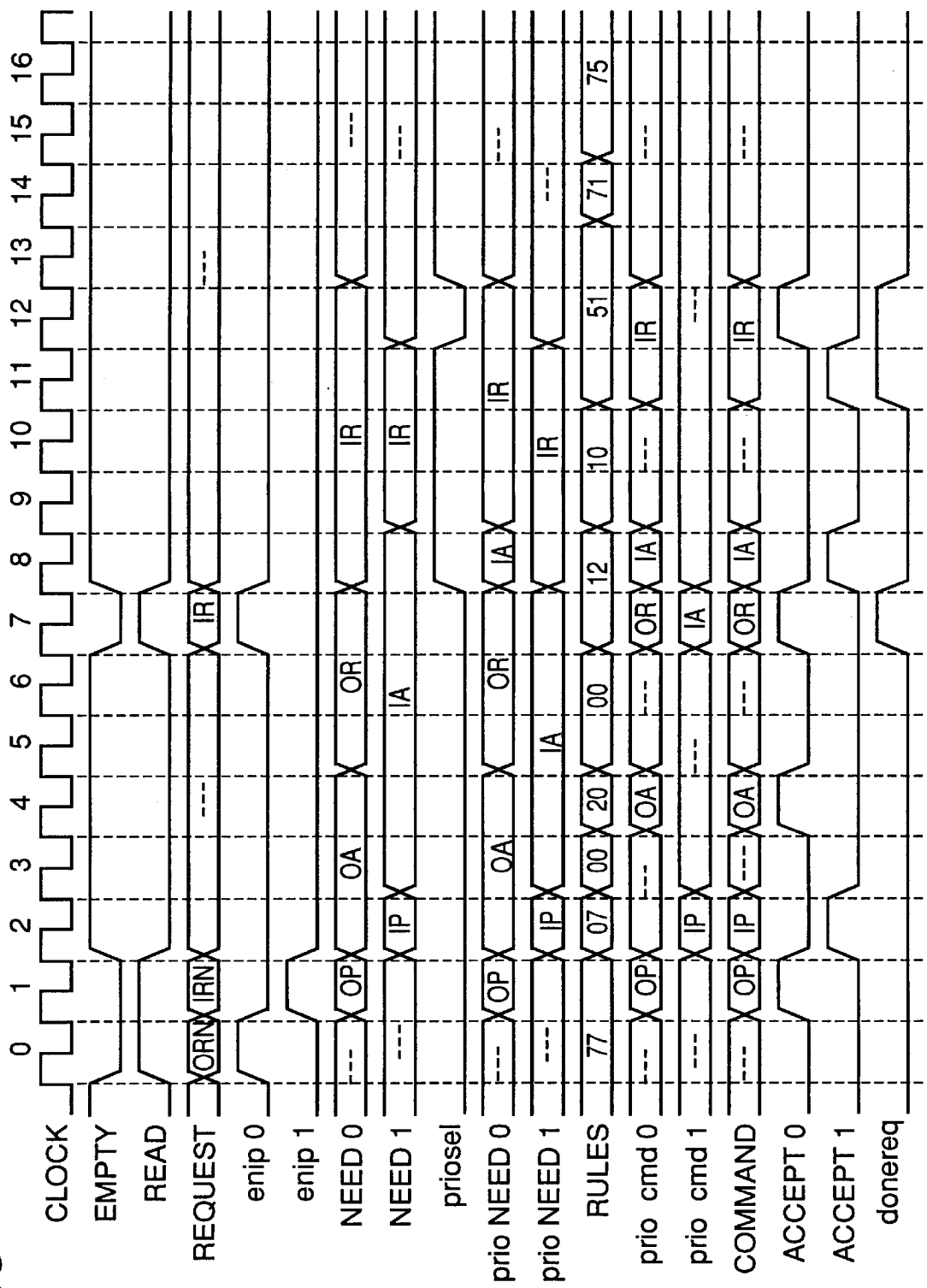
FIG. 5 is a timing diagram describing the embodiment shown in FIG. 4.

FIG. 5 describes an example timing diagram corresponding to the embodiment of FIG. 4 as it could be used for an SDRAM memory access controller. For this timing diagram some short hand notations are used for the request 410 input, the assorted need and commands 450, 451, 470, 471, 485, 486 and 490, and the rules 484.

Shorthand notation for memory access request 410:
[bank=0/I][read=R][new row flag=N/-]
  example 1: 0RN means "bank0 read with new row" (Precharge and Activate are required to precede the Read).
  example 2: 1R- means "bank1 read with same row (no new row)" (no precharge & activate are required).
Shorthand notation for need and commands 450, 451, 470, 471, 485, 486 and 490:
[bank=0/1 ][command=P/A/R]
  example 1: 0P means "bank0 Precharge"
  example 2: 1A means "bank1 Activate"
  example 3: 1R means "bank1 Read"
  example 4: - - - means null (no request or command)
Shorthand notation for rules 484:
  octal notation [0P][0A][0R][1P][1A][1R]
  example 1: 77 means "bank0 and 1 Precharge, Activate, Read are ok"
  example 2: 07 means "bank1 Precharge, Activate and Read are ok"
  example 3: 00 means "no commands are ok"
  example 4: 20 means "only bank0 Activate is ok"
The clock signal is used as both the clock signal for the embodiment as well as for the SDRAM.

For this simple example, the rule logic 487 contains the following rules:

| From | To | Minimum Number of Clocks |
| --- | --- | --- |
| Precharge bank 0/1 | Activate bank 0/1 | 3 |
| Activate banl 0/1 | Reak bank 0/1 | 3 |
| Activate bank 0/1 | Activate bank 1/0 | 3 |

During clock 0, the empty signal goes low indicating the presence of a valid memory access request 410. The read signal goes high to read this request and the enip0 directs the request to need-maker0 440. The first request is 0RN, indicating a Read of bank 0 which requires preceding Precharge and Activate commands. During clock0, the need-maker0 440 determines that the Precharge is required and outputs the need0 450 during clock 1 as 0P. Since rules 484 indicates 77 meaning any command is ok, the 0P propagates to the command output. The accept0 491 and 442 goes high indicating that a command from need-maker0 440 is accepted, resulting in need-maker0 440 to output a need for 0A Activate command of bank0 using need0 450 as shown in clock 2. It cannot be accepted however because rules 484 indicate 07, indicating no commands to bank0 can be accepted. Simultaneously, the need1 451 request for a precharge to bank1 is accepted. This process continues in this fashion converting requests during clocks 0: 0RN, 1: 1RN, 7: 1R-, into an optimal SDRAM command sequence of 0P, 1P, 0A, 0R, 1A, 1R, 1R, with all necessary SDRAM command timing constraints met.

The embodiment described by FIGS. 4 and 5 has the effects of permitting a simple sequence of memory access requests to be optimally overlapped into a sequence of memory access commands. The simple FIFO interface described is one example of a simple interface to the processes which make the memory access requests. The embodiment consists of simple logic and results in a high performance sequence of memory access commands. The timing of the output commands is isolated from the timing of the input requests, making modifications to type or configuration of memory easy to implement without requiring large changes to the memory access request generating processes.

Although the embodiment of FIG. 4 describes two requests 430 and 431, two need-makers 440 and 441, two priority selectors 461 and 462, two prioritized needs 470 and 471, two prioritized rule-checkers 482 and 483 and two prioritized commands 485 and 486, this invention is not limited to just two of each of the aforementioned items. These items can number 1 or more. This embodiment showed an example supporting 2 bank SDRAM, but it is not limited to only 2 bank SDRAM. For example, a similar embodiment can be described which supports one or more RAMS or other types or configurations of memories. This embodiment also supported a small subset of the necessary commands for a memory access controller. For example, memory access requests for other commands such as refresh and write commands is possible. This invention is not limited to the types of memory access requests discussed in the embodiments. Similarly, this simple example embodiment included a small subset of rules in rule logic 487. This invention does not limit the rules to this set. Other rules may be added, or deleted as is and when required.

One effect of this invention is that memory accesses occur sequentially as close together as possible, maximizing the performance of the memory accesses. Preprocessing is automatically overlapped with data transfers to maximize memory access performance because the acceptable memory access commands are queued at the command output selector which can permit the overlapping to occur. Multiple need-makers generate the commands for each memory access, the resulting effect being the command output selector has multiple choices as to what command to output and so can select the optimal command output order to optimize memory access performance. An effect of this invention is the relative isolation of the processes requiring memory access from the control of the memory itself due to the simple memory access request interface which, for example, could receive these requests sequentially, permitting the easy migration of the processes to new or different memory types or configurations, and the migration of a memory access controller between different process memory requirements.

What is claimed is:

1. A circuit arrangement for a memory access controller for converting memory access requests into memory access commands comprising:
   a request input for inputting sequences of said memory access requests;
   a command output for outputting sequences of said memory access commands;
   an input logic for accepting said memory access requests from said request input, said input logic used to demultiplex said memory access requests into one or more requests;
   one or more need-makers used for determining needs, said needs indicating what memory access command is needed for each of said requests;
   a prioritizer for making prioritized needs, said prioritized needs being said needs ordered by priority;
   a need selector for selecting and deriving from said prioritized needs said memory access command,
   wherein said prioritizer comprises:
      one or more multiplexers corresponding to each of said prioritized needs, where said multiplexer selects a prioritized need from said needs;
      a priority determiner for determining which of said needs should be selected as said prioritized needs for each of said multiplexers.

2. A circuit arrangement for a memory access controller for converting memory access requests into memory access commands according to claim 1 wherein said need selector comprises:
   a rule-checker for generating prioritized commands corresponding to each of said prioritized needs, said prioritized command being derived from said prioritized need if and only if said prioritized need is acceptable as determined by checking against a set of rules;
   a command output selector for selecting from said prioritized commands said memory access command.

3. A circuit arrangement for a memory access controller for converting memory access requests into memory access commands according to claim 2 wherein said rule-checker comprises:
   one or more prioritized rule-checkers for generating prioritized commands corresponding to each of said prioritized needs, said prioritized command derived from said prioritized need if and only if said prioritized need is acceptable as determined by checking against a set of rules;
   a rule logic for generating a set of rules, said set of rules used to determine what, if any, memory access commands are acceptable.

4. A circuit arrangement for a memory access controller for converting memory access requests into memory access commands according to claim 3 wherein said rule logic comprises:
   memory rule equations for determining what, if any, memory access commands are acceptable, said memory rule equations based on the rules of SDRAM access.

5. A circuit arrangement for a memory access controller for converting memory access requests into memory access commands according to claim 1 wherein said input logic comprises:
   a FIFO interface to read said memory access requests from a FIFO;
   a request demultiplexer used to demultiplex said memory access requests into one or more said requests.

6. A circuit arrangement for a memory access controller for converting memory access requests into memory access commands according to claim 1 wherein said need-makers comprise:
   a state machine for generating needs based on the order required for SDRAM access commands.

7. A circuit arrangement for a memory access controller that converts memory access requests into memory access commands, said circuit arrangement comprising:
   a requester that inputs sequences of memory access requests;
   an output system that outputs sequences of memory access commands;
   an input logic system that accepts said memory access requests from said requestor, said input logic system demultiplexing said memory access requests into at least one request;
   at least one need-maker that determines needs, said needs indicating what memory access command is needed for each said request;
   a prioritizer that prioritizes needs, said prioritizer comprising at least one multiplexer corresponding to each of said prioritized needs, said at least one multiplexer selects a prioritized need from said needs, and a priority determiner that determines which of said needs should be selected as said prioritized needs for each of said at least one multiplexer; and
   a need selector that selects and derives, said memory access command from said prioritized needs.

8. The circuit arrangement for a memory access controller that converts memory access requests into memory access commands according to claim 7, said need selector comprising:
   a rule-checker that generates prioritized commands corresponding to each of said prioritized needs, said prioritized command being derived from said prioritized need if and only if said prioritized need is acceptable based upon a set of rules; and
   a command output selector that selects said memory access command from said prioritized commands.

9. The circuit arrangement for a memory access controller that converts memory access requests into memory access commands according to claim 8, said rule-checker comprising:
   at least one prioritized rule-checker that generates prioritized commands corresponding to each of said prioritized needs, said prioritized command derived from said prioritized need if and only if said prioritized need is acceptable based upon a set of rules; and
   a rule logic that generates a set of rules, said set of rules determining what, if any, memory access commands are acceptable.

10. The circuit arrangement for a memory access controller that converts memory access requests into memory access commands according to claim 9, wherein said rule logic comprises:
    a memory rule relationship that determines what, if any, memory access commands are acceptable, said memory rule relationships based upon the rules of SDRAM access.

11. The circuit arrangement for a memory access controller that converts memory access requests into memory access commands according to claim 7, said input logic comprising:

a FIFO interface that reads said memory access requests from a FIFO; and a request demultiplexer that demultiplexes said memory access requests into at least one said request.

12. The circuit arrangement for a memory access controller that converts memory access requests into memory access commands according to claim 7, said need-maker comprising:

a state system that generates needs based upon the order required for SDRAM access commands.

* * * * *